(12) United States Patent
Denner

(10) Patent No.: US 6,453,508 B1
(45) Date of Patent: Sep. 24, 2002

(54) WEDGING BRAKE FOR A CASTER

(75) Inventor: Thomas E. Denner, Monson, MA (US)

(73) Assignee: Standex International Corp., Salem, NH (US)

( * ) Notice: Subject to any disclaimer, the term of this patent is extended or adjusted under 35 U.S.C. 154(b) by 0 days.

(21) Appl. No.: 09/790,143

(22) Filed: Feb. 21, 2001

(51) Int. Cl.⁷ .............................................. B60B 33/00
(52) U.S. Cl. ....................................................... 16/35 R
(58) Field of Search .............................. 16/35 R, 35 D; 188/1.12, 82.7

(56) References Cited

U.S. PATENT DOCUMENTS

| | | | |
|---|---|---|---|
| 1,137,329 A | * 4/1915 | Johnson | 16/35 R |
| 1,800,587 A | 4/1931 | Appleby | |
| 2,096,229 A | 10/1937 | Dudley | |
| 2,434,863 A | * 1/1948 | Parkhill | 16/35 R |
| 2,512,941 A | 6/1950 | Johnson | |
| 2,560,704 A | 7/1951 | Sebel | |
| 2,911,226 A | 11/1959 | Grieder | |
| 3,239,873 A | 3/1966 | Fisher | |
| 3,628,214 A | * 12/1971 | MacKay | 16/35 R |
| 3,656,203 A | * 4/1972 | Waflart, Jr. | 16/35 R |
| 3,876,041 A | * 4/1975 | Pivacek | 16/35 D |
| 3,902,576 A | 9/1975 | Pitan et al. | |
| 4,336,630 A | * 6/1982 | Page | 16/35 R |
| 4,385,414 A | 5/1983 | Damico | |
| 4,559,668 A | * 12/1985 | Black | 16/21 |
| 5,829,096 A | 11/1998 | Perry | |

FOREIGN PATENT DOCUMENTS

| | | |
|---|---|---|
| DE | 31 45 758 A1 | 5/1983 |
| NL | 7613360 | 12/1976 |

* cited by examiner

Primary Examiner—Chuck Y. Mah
(74) Attorney, Agent, or Firm—McCormick, Paulding & Huber LLP

(57) ABSTRACT

A brake for a caster having a caster wheel with a wheel hub axially mounted to a fork. The brake includes a leg adapted to pivotally engage the fork of the caster. When the brake is mounted to the caster, the leg wedges between the fork and the wheel hub to frictionally arrest the motion of the caster wheel.

6 Claims, 2 Drawing Sheets

WEDGING BRAKE FOR A CASTER

FIELD OF THE INVENTION

The present invention relates to a brake and, more particularly, to a brake for a caster which wedges between the wheel hub and fork of the caster to arrest the motion of the caster wheel.

BACKGROUND OF THE INVENTION

Casters equipped with brakes are used in a variety of applications. For example, they are commonly used on computer carts, hospital beds and food service carts, as well as heavier duty applications such as on U-boat carts used to stock shelves in a super market.

Prior art brakes for casters are generally designed to impede the rotational motion of the caster by locking onto the periphery of the caster wheel, i.e. the rolling surface of the wheel. A typical prior art caster brake will include a generally L shaped brake. One leg of the L will be pivotally attached to the axle bolt of the caster while the other leg will grip the periphery of the wheel when pressure is applied to the brake.

However, the pressure of the prior art brakes on the periphery of the wheel has a tendency to deform the shape of the wheel and/or the brake. Additionally, if the gripping portion of the brake includes edges which are not sufficiently rounded, the brake may bite into the periphery of the wheel causing further deformation to the wheel. In an attempt to prevent deformation, prior art brakes are often heat treated, which further adds to the cost and complexity of the caster. Moreover, due to their complexity, prior art brakes are not easily retrofit to existing casters in the field.

A variety of caster brakes, having shapes other than that of an L, can also be found in the prior art. One such example of a prior art caster is disclosed in U.S. Pat. No. 2,096,229 issued to Dudley (hereinafter Dudley). Dudley relates to caster brakes wherein the object of the invention is to provide a brake for a caster in which the brake shoe is pivoted on an axis eccentric to the axis of the caster wheel by a cam member. The pivots are eccentric to the axis of the caster wheel so that in turning the brake shoe in a counter-clockwise direction on the pivots the brake shoe is rotated into engagement with the periphery of the caster wheel.

However, the locking surface in Dudley is on the periphery of the wheel. Additionally, a cam member is required to be actuated to lock the brake, adding to the cost and complexity of the caster. Furthermore, the brake cannot be shipped as a spare part and retrofit to casters in the field.

Other examples of a prior art caster brakes are disclosed in U.S. Pat. Nos. 2,512,941, 3,902,576, 4,385,414, and 5,829,096. In each case, the brake locks the caster by frictionally gripping the peripheral surface of the wheel. Additionally, the brakes are not designed to be retrofit in the field.

Accordingly, there is a need for an improved brake for a caster which does not lock on the periphery of the caster wheel, is simple and inexpensive to manufacture and can be retrofit in the field to existing casters.

SUMMARY OF THE INVENTION

The present invention offers advantages and alternatives over the prior art by providing a caster brake which wedges between the fork and wheel hub of a caster to impede the rotational motion of the caster wheel. The brake is free from contact with the periphery of the caster wheel; therefore avoiding any deformation of the wheel or the brake as braking pressure is applied. The brake is also simple in construction and inexpensive to manufactured. The brake can also be shipped as a spare part to be retrofit to existing casters in the field.

These and other advantages are accomplished in an exemplary embodiment of the invention by providing a brake for a caster having a caster wheel with a wheel hub axially mounted to a fork. The brake includes a leg adapted to pivotally engage the fork of the caster. When the brake is mounted to the caster, the leg wedges between the fork and the wheel hub to frictionally arrest the motion of the caster wheel.

In an alternative embodiment of the invention, when the leg of the brake wedges between the fork and the hub, the brake is free from contact with the periphery of the caster wheel.

In another alternative embodiment of the invention the brake has a generally U shape. The brake includes a pair of legs extending outwardly from a closed base end. The pair of legs has distal end portions which are bent at an angle to project outwardly from a center line of the brake. The distal end portions are adapted to pivotally engage a pair of inside walls of the fork of the caster. When the brake is mounted to the caster, the legs wedge between the inside walls of the fork and the wheel hub to frictionally arrest the motion of the caster wheel.

DETAILED DESCRIPTION OF PREFERRED EMBODIMENTS

Figure 1:
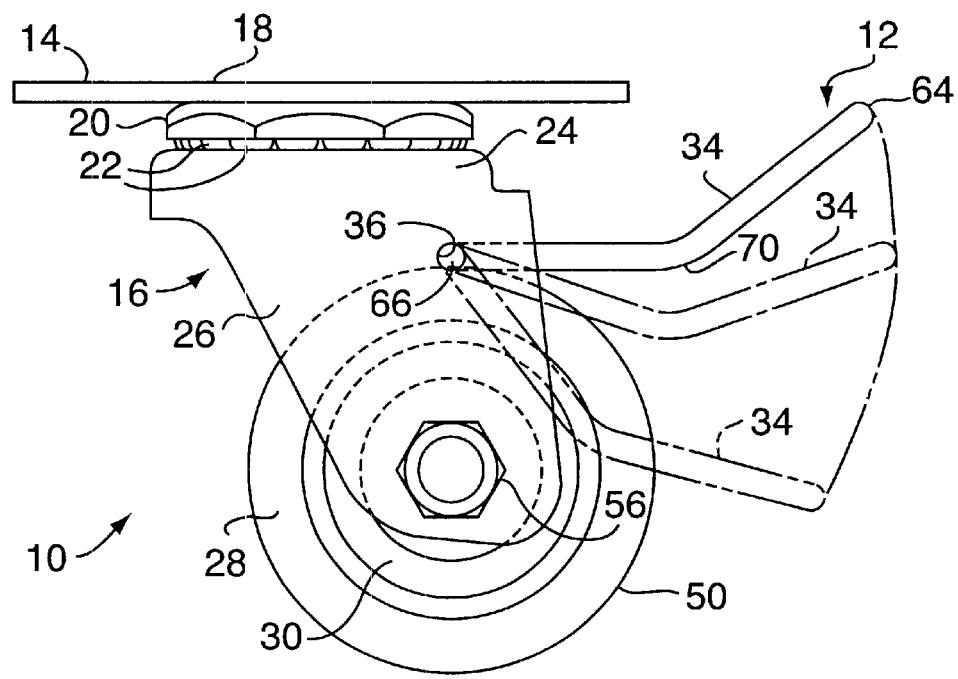
FIG. 1 is a side view of a caster in accordance with the present invention.

Referring to FIG. 1 an exemplary embodiment of a caster 10 with a brake 12 in accordance with the present invention is generally shown. The caster 10 includes a top plate 14 pivotally mounted to a fork 16. The top plate 14 includes a top portion 18 (best seen in FIG. 2) and a race portion 20 used to capture a set of ball bearings 22. The fork 16 includes a barrel portion 24 having a pair of fork legs 26 extending downwardly therefrom. A caster wheel 28 has a wheel hub 30 axially mounted to the fork legs 26 of the fork 16. The brake 12 includes a pair of legs pivotally engaged to the fork 16 of the caster 10 through fork clearance holes 36. As will be discussed in greater detail hereinafter, when the brake 12 is pivoted downward, the legs 34 wedge between the fork 16 and the wheel hub 30 to frictionally arrest the motion of the caster wheel 28.

Figure 2:
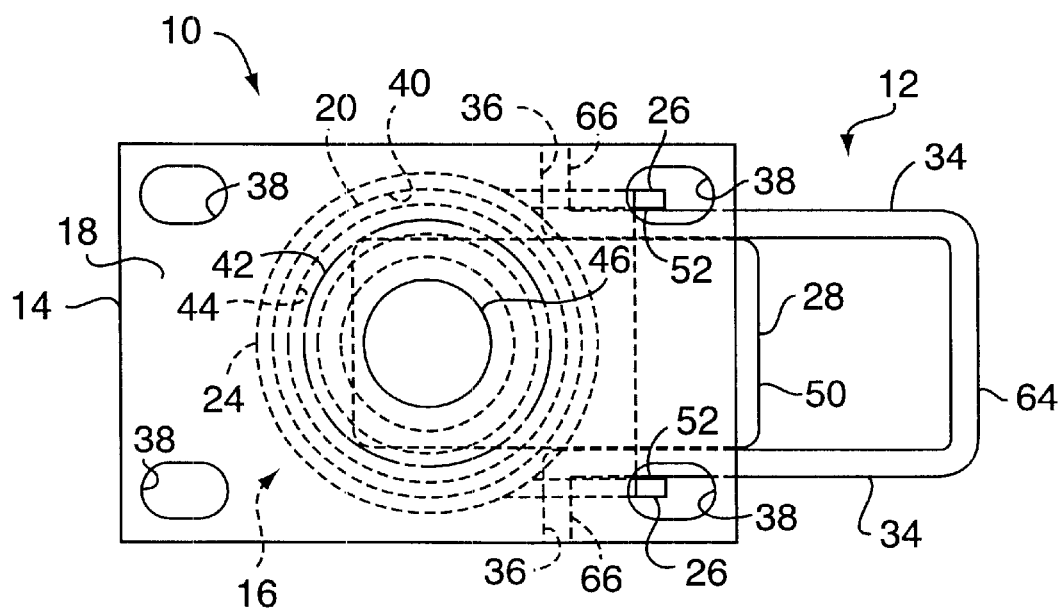
FIG. 2 top view of the caster of FIG. 1.

Referring to FIG. 2, the top portion 18 of the top plate 14 is generally rectangular in shape and includes slotted mounting holes 38 located in each corner of the top portion 18. An indentation 40 in the bottom side of the top portion 18 is sized to receive the race portion 20 which guides the ball bearings 22 around centerline 42 in raceway 44. A stud (or rivet) 46 extends through the center of the top plate 18 and the barrel portion 24 to capture the ball bearings 22, and allow the caster wheel 28 and brake 12 to swivel on swivel radius 48. The caster wheel 28 includes a periphery 50, i.e., the rolling surface of the wheel 28 which comes in contact with the floor (not shown). When the legs 34 of the brake 12 are wedged between the fork 16 and the wheel 28 to brake the caster wheel 28, the brake is free from contact with the periphery 50 of the caster wheel 28.

Figure 3:
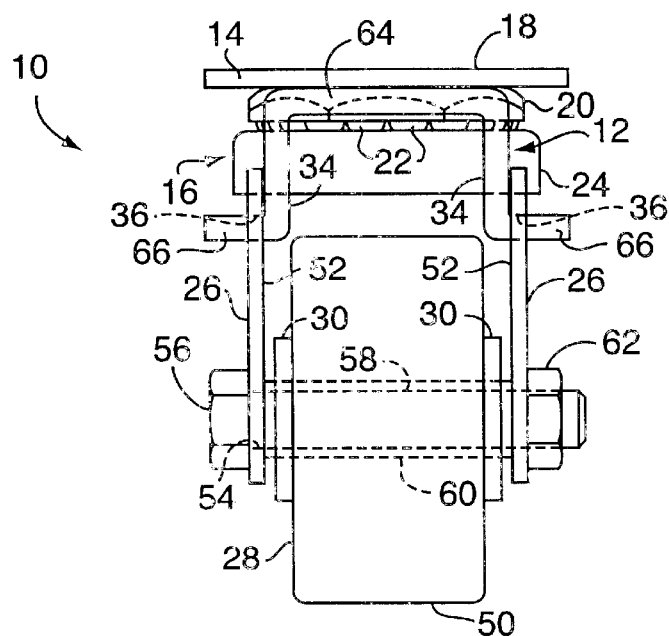
FIG. 3 is a front view of the caster of FIG. 1.

Referring to FIG. 3, the barrel portion 24 of the fork 16 is generally circular in shape and extends down and around the fork legs 26. The fork legs 26 have an inside wall 52 against which the legs 34 of the brake 12 are pivotally engaged. The fork legs 26 include axle boltholes 54 through which axle bolt 56 extends. A spanner 58 is concentrically mounted over the axle bolt 56 to support a plurality of linear bearings 60 which in turn support the caster wheel 28. The bolt 56, spanner 58 and linear bearings 60 are securely captured with nut 62.

Figure 4:
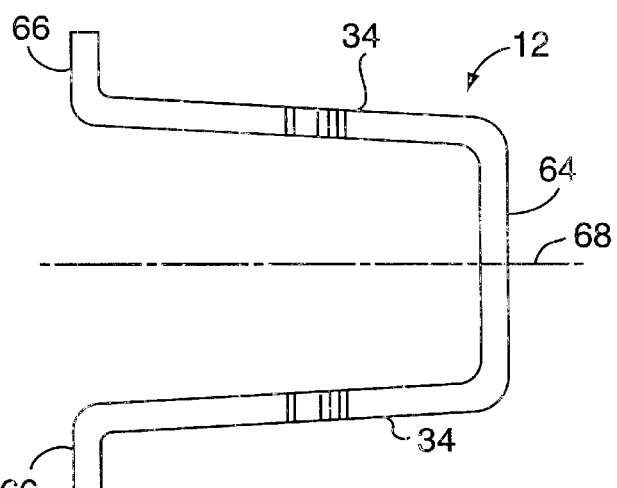
FIG. 4 is a top view of the brake of FIG. 1.
Figures 5, 6:
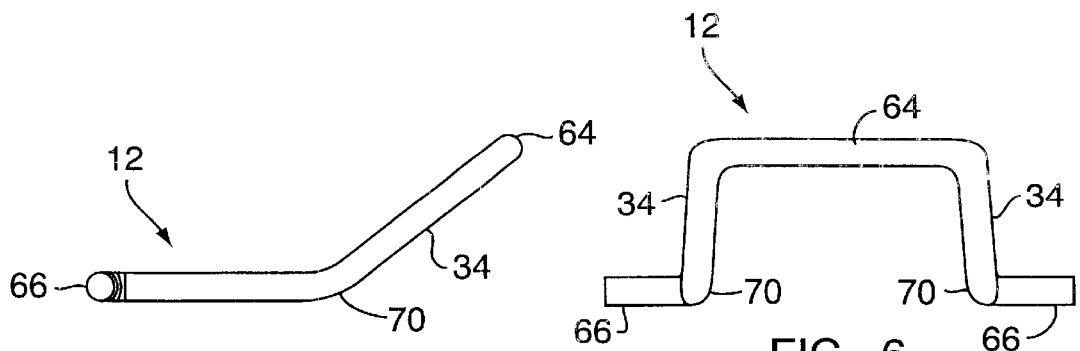
FIG. 5 is a side view of the brake of FIG. 1.
FIG. 6 is a front view of the brake of FIG. 1.

Referring to FIGS. 4, 5 and 6, the brake 12 is constructed of a resilient wire, e.g., 0.162-inch diameter tempered wire, and is bent into a generally U shaped brake. The pair of legs extends outwardly from a closed base end 64. The legs 34 have distal end portions 66, which are bent at an angle to project outwardly from a center line 68 of the brake 12. The legs 34 are also include an angular bend 70 intermediate the distal end portions 66 and the closed base end 64.

During assembly, or when being retrofit to an existing caster in the field, the legs are compressed inwardly to allow the distal end portions 66 to clear the pair of inside walls 52 of the fork 16, and to be aligned with the fork clearance holes 36 extending therethrough. The legs 34 are then released to cause the distal end portions 66 to spring into the holes 36 and pivotally engage the fork 16.

Referring back to FIGS. 1 and 3, the brake 12 is held in a release position, i.e., a position where the brake 12 does not engage the caster wheel 28, by the frictional force of the resilient legs 34 pressing against the inside walls 52 of the fork 16. By pivoting the brake 12 downwardly the legs 34 wedge between the inside walls 52 of the fork 16 and the wheel hubs 30 to frictionally arrest the motion of the caster wheel 28, while the closed base end 64 of the brake 12 clears the periphery 50 of the wheel 28.

Advantageously, the further the brake 12 is pressed downward the more braking power is exerted to the wheel hub. Additionally, by clearing the periphery 50 of the wheel 28, the pressure to deform the wheel 28 and/or the brake 12 is greatly reduced.

Though the brake 12 as shown and discussed in this application discloses end portions 66 bent at substantially right angles, one skilled in the art would recognize that other angles may also be used. Additionally, other means to pivotally engage the brake 12 to the fork 16 may also be used, e.g., a pivoting rivet extending through the fork 16 and the distal end of the legs 34. Moreover, it is within the scope of this invention that the brake 12 may be constructed of materials other than a resilient metal wire and has a shape other than that of a U, e.g., the shape may be more sinuous and the material may be plastic. Further, though the brake 12 is shown on a swiveling caster 10, skilled in the art would recognize that the brake 12 might be applied to non-swivel casters as well.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A caster comprising:
    a fork having a pair of fork legs extending substantially parallel thereto, each fork leg including an inside wall;
    a caster wheel having a wheel hub axially mounted between the fork legs; and
    a brake constructed of a resilient material, the brake including,
    a pair of substantially parallel break legs extending longitudinally from a closed base end to form a generally U shaped brake which straddles the wheel and has a center line which extends midway between the legs, the pair of brake legs having distal end portions which are bent at substantially right angles to the center line of the brake and which pivotally engage the pair of inside walls of the fork legs;
    wherein, when the brake is in a brake position, the pair of brake legs wedge between the inside walls of the fork and the wheel hub to frictionally arrest the motion of the caster wheel; and
    wherein, when the brake is in a release position, the frictional force of the resilient brake legs pressing against the inside walls of the fork prevent the brake from engaging the wheel.

2. The caster of claim 1 wherein, when the brake legs wedge between the fork legs and the wheel hub, the brake is free from contact with an outer periphery of the caster wheel.

3. The caster of claim 1 wherein the distal end portions of the brake legs pivotally engage the inside walls of the fork legs through a pair of brake clearance holes which extend through the fork legs, the brake clearance holes being spaced from the wheel axis a distance greater than the radius of the wheel.

4. The caster of claim 1 wherein the brake is constructed of a tempered wire.

5. The caster of claim 4 wherein the tempered wire is approximately 0.162 inches in diameter.

6. The caster of claim 1 wherein the legs are bent at an angle intermediate the distal end portion and the closed base end.

* * * * *